United States Patent
Rump

[11] Patent Number: 6,086,168
[45] Date of Patent: Jul. 11, 2000

[54] METHOD FOR OPERATING A MOTOR VEHICLE WITH DRIVING-STABILIZING BRAKE INTERVENTIONS

[75] Inventor: Siegfried Rump, Weinstadt, Germany

[73] Assignee: DaimlerChrysler AG, Stuttgart, Germany

[21] Appl. No.: 08/911,748

[22] Filed: Aug. 15, 1997

[30] Foreign Application Priority Data

Aug. 16, 1996 [DE] Germany .......................... 196 32 943

[51] Int. Cl.$^7$ ...................................... B60T 8/60
[52] U.S. Cl. ...................... 303/191; 303/121; 303/146; 303/192
[58] Field of Search .................... 303/146, 189, 303/190, 192, 137, 140, 121, 191; 318/586, 587; 701/70, 82, 83, 72; 702/148, 150

[56] References Cited

U.S. PATENT DOCUMENTS

| | | |
|---|---|---|
| 4,898,431 | 2/1990 | Karnopp et al. . |
| 4,998,593 | 3/1991 | Karnopp et al. . |
| 5,134,352 | 7/1992 | Matsumoto et al. .................... 303/146 |
| 5,445,443 | 8/1995 | Hauser et al. ........................... 303/137 |
| 5,869,943 | 2/1999 | Nakashima et al. ................ 303/146 X |

FOREIGN PATENT DOCUMENTS

| | | |
|---|---|---|
| 21 33 547 C2 | 1/1973 | Germany . |
| 39 19 347 A1 | 2/1990 | Germany . |
| 43 05 155 A1 | 8/1994 | Germany . |
| 1-168555 | 7/1989 | Japan . |
| 7-215193 | 8/1995 | Japan . |
| 2 266 957 | 11/1993 | United Kingdom . |

OTHER PUBLICATIONS

Official Letter of Provisional Rejection with translation of Japanese Patent Appln. No. 254 022/1997, Feb. 2, 1999.
Automotive Engineer's Hand Book, Society of Automotive Engineers of Japan, Section 3.6.1 with translation (1989).
"Toyota Soarer", pp. 3–54 to 3–59, issued in May 1991.
FDR—Die Fahrdynamik–regelung von Bosch, V. van Zanten et al., ATZ Automobiltechnische Zeitschrift, Nov. 1994, No. 11, pp. 674–678 and 683–689.
Fahrzeugdynamik: Grundlagen der Modellierung und Regelung, Guenter Roppenecker, AT Automatisierungstechnik, Oct. 1994, No. 10, pp. 429–441.
Das neue Fahrsicherheitssytem Electronic Stability Program von Mercedes–Benz, ATZ Automobiltechnische Zeitschrift, Nov. 1994, No. 11, pp. 656–658, 660 and 667–670.

*Primary Examiner*—Douglas C. Butler
*Attorney, Agent, or Firm*—Evenson, McKeown, Edwards & Lenahan P.L.L.C.

[57] ABSTRACT

A method operates a motor vehicle such as an off-road vehicle with a brake system in which wheels on the same axle can be braked independently of one another. Vehicle-movement-stabilizing braking interventions are performed automatically by the brake system. For at least one vehicle-movement dynamics characteristic variable which is indicative of the tendency of the vehicle to tilt about the longitudinal axis of the vehicle, an associated tilting-prevention threshold value is prescribed. The respective characteristic-variable instantaneous value is continuously acquired and compared with the tilting-prevention threshold value. The wheels which are on the outside during cornering are, for the purpose of preventing tilting, braked as soon as an associated characteristic-variable instantaneous value exceeds the associated tilting-prevention threshold value.

2 Claims, 1 Drawing Sheet

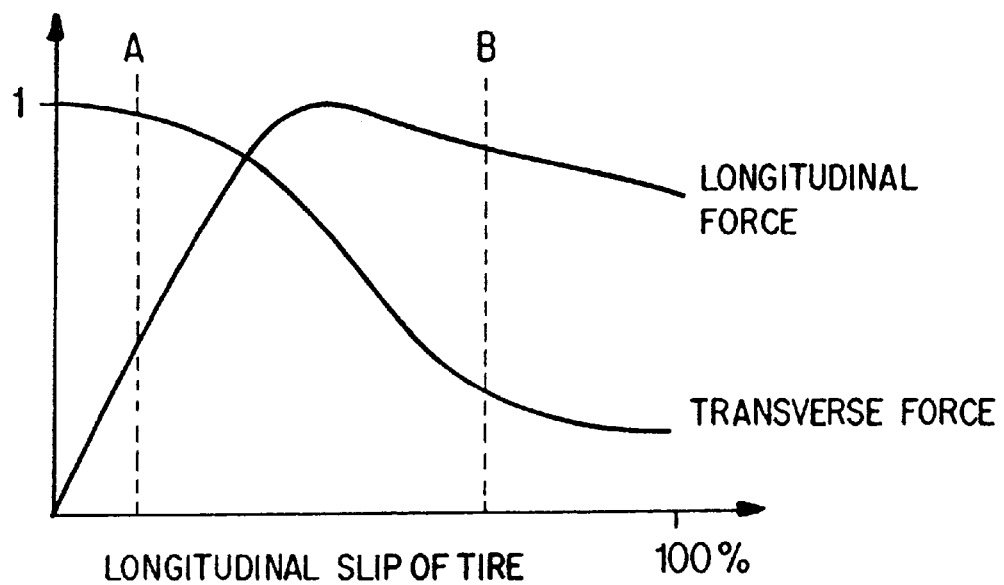

METHOD FOR OPERATING A MOTOR VEHICLE WITH DRIVING-STABILIZING BRAKE INTERVENTIONS

This application claims the priority of 196 32 943.4, the disclosure of which is expressly incorporated by reference herein.

The present invention relates to a method for operating a motor vehicle with a brake system, and more particularly, to a method in which wheels on the same axle can be braked independently of one another, vehicle-movement-stabilizing brake interventions being performed automatically by the brake system.

A brake-intervention operating method for a motor vehicle is described in DE 43 05 155 A1. A vehicle-movement dynamics control system has a measured-data acquisition system, a superordinate vehicle-movement dynamics computer and a subordinate brake controller. The measured-data acquisition system supplies driving-dynamic characteristic variables which are made available to the vehicle-movement dynamics computer. If the attitude angle and yaw velocity vehicle-movement dynamics characteristic variables lie outside prescribable ranges, the vehicle-movement dynamics computer can change the brake pressure at all the wheels individually and separately with the aid of the brake controller. Thereby, the attitude angle and yaw velocity of the vehicle are brought back into the prescribable ranges.

Vehicle-movement dynamics control systems with automatic brake interventions with which oversteering or understeering is counteracted, are also installed, under the abbreviation ESP in series-produced Mercedes-Benz vehicles. With this system, individual wheels can be braked or released selectively, in order to deal with a swerving vehicle and thereby keep it on course.

With the abovementioned already known methods and devices, the goal is consequently essentially to prevent the vehicle from turning about the vertical axis of the vehicle by influencing the brake pressure at individual wheels.

DE 21 33 547 C2 describes a brake-power control with which utility vehicles with a high center of gravity and a short wheel base can be braked in such a way that tilting about the transverse axis of the vehicle during braking is reliably prevented. Particularly in vehicles with a high center of gravity, for example off-road vehicles, the risk of tilting about the longitudinal axis of the vehicle occurs during cornering on an underlying surface with good grip.

An object of the present invention is to provide an operating method with which the tilting of a motor vehicle about the longitudinal axis of the vehicle can also be reliably prevented during driving.

The foregoing object has been achieved in accordance with the present invention by providing a method for operating a motor vehicle in which for at least one vehicle-movement dynamics characteristic variable which is indicative of the tendency of the vehicle to tilt about the longitudinal axis of the vehicle, an associated tilting-prevention threshold value is prescribed and the respective characteristic-variable instantaneous value is acquired continuously and is compared with the tilting-prevention threshold value and the wheels which are on the outside during cornering are braked, for the purpose of preventing tilting, as soon as a characteristic-variable instantaneous value exceeds the associated tilting-prevention threshold value.

The foregoing method in accordance with the present invention is suitable for motor vehicles with a brake system with which wheels on the same axle can be braked independently of one another. For at least one vehicle-movement dynamics characteristic variable which is indicative of the tendency of the vehicle to tilt about the longitudinal axis, an associated tilting-prevention threshold value is prescribed. The respective characteristic-variable instantaneous value is acquired continuously and compared with the tilting-prevention threshold value. As soon as a characteristic-variable instantaneous value exceeds the associated tilting-prevention threshold value, the wheels which are on the outside during cornering are braked in order to prevent the vehicle tilting about the longitudinal axis of the vehicle.

According to another advantageous aspect of the present invention, vehicle-movement dynamics characteristic variables which are indicative of the tendency of the vehicle to tilt about the longitudinal axis of the vehicle are the lateral acceleration, the change of the lateral acceleration over time, the attitude angle, the attitude-angle velocity, the change over time of the attitude-angle velocity and/or the slip angle.

BRIEF DESCRIPTION OF THE DRAWING

Other objects, advantages and novel features of the present invention will become apparent from the following detailed description of the invention when considered in conjunction with the accompanying drawing wherein the single FIGURE is a schematic diagram showing the qualitative relationship between the longitudinal slip of a tire and the longitudinal and transverse forces which can be transmitted by the tire and which have been scaled to the maximum value of one.

DETAILED DESCRIPTION OF THE DRAWING

The method according to the present invention can be implemented by any given conventional vehicle-movement dynamics control system, for example the Mercedes-Benz ESP system. Such a system needs to be modified only in a way which is easily ascertainable by a person skilled in the art. Thus, no further explanation is needed here. In most of these systems, the instantaneous values of vehicle-movement dynamics characteristic variables which are available as indicative of the tendency of the vehicle to tilt about the longitudinal axis of the vehicle, include variables such as the lateral acceleration, the change over time of the lateral acceleration, the attitude angle, the attitude-angle velocity, the change in the attitude-angle velocity over time and the slip angle.

In a first embodiment of the method according to the present invention, lateral acceleration is the only vehicle-movement dynamics characteristic variable indicative of the tendency of the vehicle to tilt about the longitudinal axis of the vehicle to be used. An associated, prescribable tilting-prevention threshold value is provided for the lateral acceleration. In the event of cornering, the vehicle is kept on course by the lateral forces acting on the tire contact areas on the underlying surface. The majority of these lateral forces are absorbed by the wheels or tires which are on the outside during cornering.

In the sole FIGURE, the longitudinal and lateral forces which can be transmitted by the tire are plotted qualitatively as a function of the longitudinal slip of the tire, in which an instantaneous operating state of a tire which is on the outside during cornering is represented in, for example, by the dashed line A. In this operating state A, a specific lateral acceleration which acts at the center of gravity of the vehicle occurs. If this lateral acceleration is above the tilting-prevention threshold value, the wheels which are on the outside during cornering are placed in a state of high brake slip by actuating a corresponding brake intervention. As a result, the tires assume, for example, the operating state B.

At the operating point B, the lateral or transverse force which can be transmitted by the tires is significantly lower than at the operating point A. As a result, although the wheels which are on the outside during cornering can no longer withstand the lateral acceleration which is acting on them, and this will possibly increase the attitude angle and will turn the front or rear of the vehicle to a certain extent in the direction of the moment of the lateral acceleration, at the same time the tilting moment is, however, reduced and the vehicle is prevented from tilting about its longitudinal axis.

In another embodiment of the method according to the present invention, the lateral acceleration, the change in the lateral acceleration over time, the attitude angle, the attitude-angle velocity, the change in the attitude-angle velocity over time and the slip angle are used as vehicle movement-dynamics characteristic variables which are indicative of the tendency of the vehicle to tilt about the longitudinal axis of the vehicle. In each case, associated tilting-prevention threshold values are provided for each of these vehicle-movement dynamics characteristic variables. If one or more characteristic variables exceed the associated threshold values, the vehicle-movement dynamics control system brakes the wheels which are on the outside during cornering, such that they are placed in a high slip state. The lateral force which can be transmitted also drops to a value which is lower than the absolute value of the lateral force acting, before braking, on the wheels which are on the outside during cornering. As a result, the lateral force which is acting on the wheels also drops and the vehicle is prevented from tilting. If the vehicle-movement-dynamics characteristic variables which are indicative of the tendency of the vehicle to tilt drop back below the associated tilting-prevention threshold values as a result of the vehicle-movement dynamics operating state which then arises, the braking of the wheels which are on the outside during cornering is reduced.

In a further embodiment of the present invention, the tilting-prevention threshold values of the vehicle-movement dynamics characteristic variables are prescribed as value pairs in order to make a switching hysteresis available. That is, one value of the value pairs constitutes the threshold value for the triggering of the braking of the wheels which are on the outside during cornering and the other value of the value pair constitutes the threshold value for the reduction in the braking of the wheels which are on the outside during cornering. The value for brake triggering is, of course, higher than the value for braking reduction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for operating a motor vehicle with at least one axle and two wheels thereon and with a brake system for braking different wheels on the axle independently of one another, comprising the steps of automatically carrying out vehicle movement-stabilizing braking interventions with the brake system, prescribing an associated tilting-prevention threshold value for at least one vehicle-movement dynamics characteristic variable representative of a tendency of the vehicle to tilt about a vehicle longitudinal axis, continuously acquiring a respective characteristic-variable instantaneous value, comparing the instantaneous value with the threshold value, and braking the wheel which are outside during vehicle cornering for preventing tilting about the vehicle longitudinal axis as soon as the instantaneous value exceeds the threshold value.

2. The method according to claim 1, wherein the at least one characteristic value comprises one or more of lateral acceleration, change over time of the lateral acceleration, attitude angle, attitude-angle velocity, change over time of the attitude-angle velocity and the slip angle.

* * * * *